(12) United States Patent
James

(10) Patent No.: US 9,095,784 B2
(45) Date of Patent: Aug. 4, 2015

(54) VAPOUR RECOVERY UNIT FOR STEAM ASSISTED GRAVITY DRAINAGE (SAGD) SYSTEM

(75) Inventor: Kenneth James, Calgary (CA)

(73) Assignee: 1nSite Technologies Ltd., Calgary, Alberta (CA)

( * ) Notice: Subject to any disclaimer, the term of this patent is extended or adjusted under 35 U.S.C. 154(b) by 1005 days.

(21) Appl. No.: 13/074,275

(22) Filed: Mar. 29, 2011

(65) Prior Publication Data

US 2012/0048382 A1    Mar. 1, 2012

Related U.S. Application Data

(60) Provisional application No. 61/376,298, filed on Aug. 24, 2010.

(51) Int. Cl.
*B01F 5/04* (2006.01)
*B01D 3/10* (2006.01)

(52) U.S. Cl.
CPC ........ *B01D 3/105* (2013.01); *B01D 2259/4516* (2013.01); *Y10T 137/0318* (2015.04)

(58) Field of Classification Search
CPC ........... B01D 2259/4516; B01D 3/105; Y10T 137/0318
USPC ............ 137/888, 892, 893, 563, 14; 417/192, 417/187; 366/136, 137, 159.1, 163.2
See application file for complete search history.

(56) References Cited

U.S. PATENT DOCUMENTS

| | | |
|---|---|---|
| 1,617,082 A | 2/1927 | Price |
| 2,310,649 A | 2/1943 | Peebles |
| 2,920,039 A | 1/1960 | Miller |
| 3,155,600 A | 11/1964 | Williamson |
| 3,778,969 A | 12/1973 | Sudduth |
| 3,819,054 A | 6/1974 | Long et al. |
| 4,002,538 A | 1/1977 | Pottharst, Jr. |
| 4,007,921 A * | 2/1977 | Zingg ............................ 366/10 |
| 4,269,776 A * | 5/1981 | Keunecke et al. ............ 549/248 |
| 4,428,328 A | 1/1984 | Ratliff |
| 4,683,025 A | 7/1987 | Flores |
| 4,880,533 A | 11/1989 | Hondulas |
| 4,924,936 A | 5/1990 | McKown |
| 4,938,876 A | 7/1990 | Ohsol |

(Continued)

FOREIGN PATENT DOCUMENTS

| | | | |
|---|---|---|---|
| CA | 2 547 503 A1 | 6/2005 | |
| CA | 2 609 859 A1 | 5/2009 | |

(Continued)

*Primary Examiner* — Marina Tietjen
*Assistant Examiner* — Umashankar Venkatesan
(74) *Attorney, Agent, or Firm* — Fay Sharpe LLP

(57) ABSTRACT

A vapour recovery process for a SAGD (Steam Assisted Gravity Drainage) system for a heavy oil recovery facility, the process comprising a venturi ejector having one active inlet, one passive inlet and one outlet, the active inlet being supplied with natural gas to provide gas flow sufficient to operate the ejector, the passive inlet being connected to a mixture of vented vapours from storage tanks and low pressure equipment, and the outlet supplying fuel to a system along with the natural gas; wherein the movement of the natural gas through the ejector creates a vacuum so as to draw the vapours from the tanks and low pressure equipment into the ejector and then toward the low pressure fuel system, wherein the vented vapours are burned, instead of being released to the atmosphere.

10 Claims, 1 Drawing Sheet

(56) References Cited

U.S. PATENT DOCUMENTS

| | | | |
|---|---|---|---|
| 5,195,587 A * | 3/1993 | Webb | 166/267 |
| 5,209,762 A * | 5/1993 | Lowell | 95/192 |
| 5,221,439 A | 6/1993 | Li et al. | |
| 5,236,605 A | 8/1993 | Warncke | |
| 5,303,725 A | 4/1994 | Hilgren | |
| 5,415,673 A | 5/1995 | Hilton et al. | |
| 5,516,119 A * | 5/1996 | Trackwell et al. | 277/409 |
| 5,762,416 A * | 6/1998 | LeSire | 366/136 |
| 5,906,714 A | 5/1999 | Gramkow et al. | |
| 5,948,242 A | 9/1999 | Ohsol et al. | |
| 6,019,818 A | 2/2000 | Knapp | |
| 6,199,834 B1 | 3/2001 | Popov et al. | |
| 6,234,760 B1 | 5/2001 | Popov et al. | |
| 6,244,098 B1 | 6/2001 | Chen et al. | |
| 6,315,000 B1 | 11/2001 | Goodyear | |
| 6,418,957 B1 | 7/2002 | Goodyear | |
| 6,536,523 B1 | 3/2003 | Kresnyak et al. | |
| 6,938,583 B2 | 9/2005 | Wood | |
| 7,306,057 B2 | 12/2007 | Strong et al. | |
| 7,326,285 B2 | 2/2008 | Chowdhury | |
| 7,647,976 B2 | 1/2010 | Tsilevich | |
| 7,670,573 B2 | 3/2010 | Stell et al. | |
| 7,681,643 B2 | 3/2010 | Heins | |
| 7,814,933 B2 * | 10/2010 | Khang et al. | 137/563 |
| 2002/0043289 A1 | 4/2002 | Goodyear | |
| 2002/0088703 A1 | 7/2002 | Walker | |
| 2002/0184784 A1 | 12/2002 | Strzala | |
| 2007/0007172 A1 | 1/2007 | Strack et al. | |
| 2007/0051513 A1 | 3/2007 | Heins | |
| 2008/0093264 A1 | 4/2008 | Sarkar et al. | |
| 2008/0110630 A1 | 5/2008 | Minnich et al. | |
| 2009/0008334 A1 | 1/2009 | Schoen et al. | |
| 2009/0020456 A1 | 1/2009 | Tsangaris et al. | |
| 2009/0084707 A1 | 4/2009 | Gil | |
| 2010/0058771 A1 | 3/2010 | Gil et al. | |
| 2010/0181184 A1 | 7/2010 | Bahr | |
| 2011/0036308 A1 | 2/2011 | Betzer-Zilevitch | |
| 2011/0061816 A1 | 3/2011 | Duesel, Jr. et al. | |
| 2011/0089013 A1 | 4/2011 | Sakurai et al. | |
| 2012/0000642 A1 | 1/2012 | Betzer Tsilevich | |
| 2012/0179624 A1 | 7/2012 | Berry et al. | |
| 2012/0192716 A1 | 8/2012 | Chen et al. | |

FOREIGN PATENT DOCUMENTS

| | | |
|---|---|---|
| CA | 2 610 052 A1 | 5/2009 |
| GB | 2399864 | 9/2004 |
| WO | WO 2005/054746 A2 | 6/2005 |
| WO | WO 2008/098242 A2 | 8/2008 |

* cited by examiner

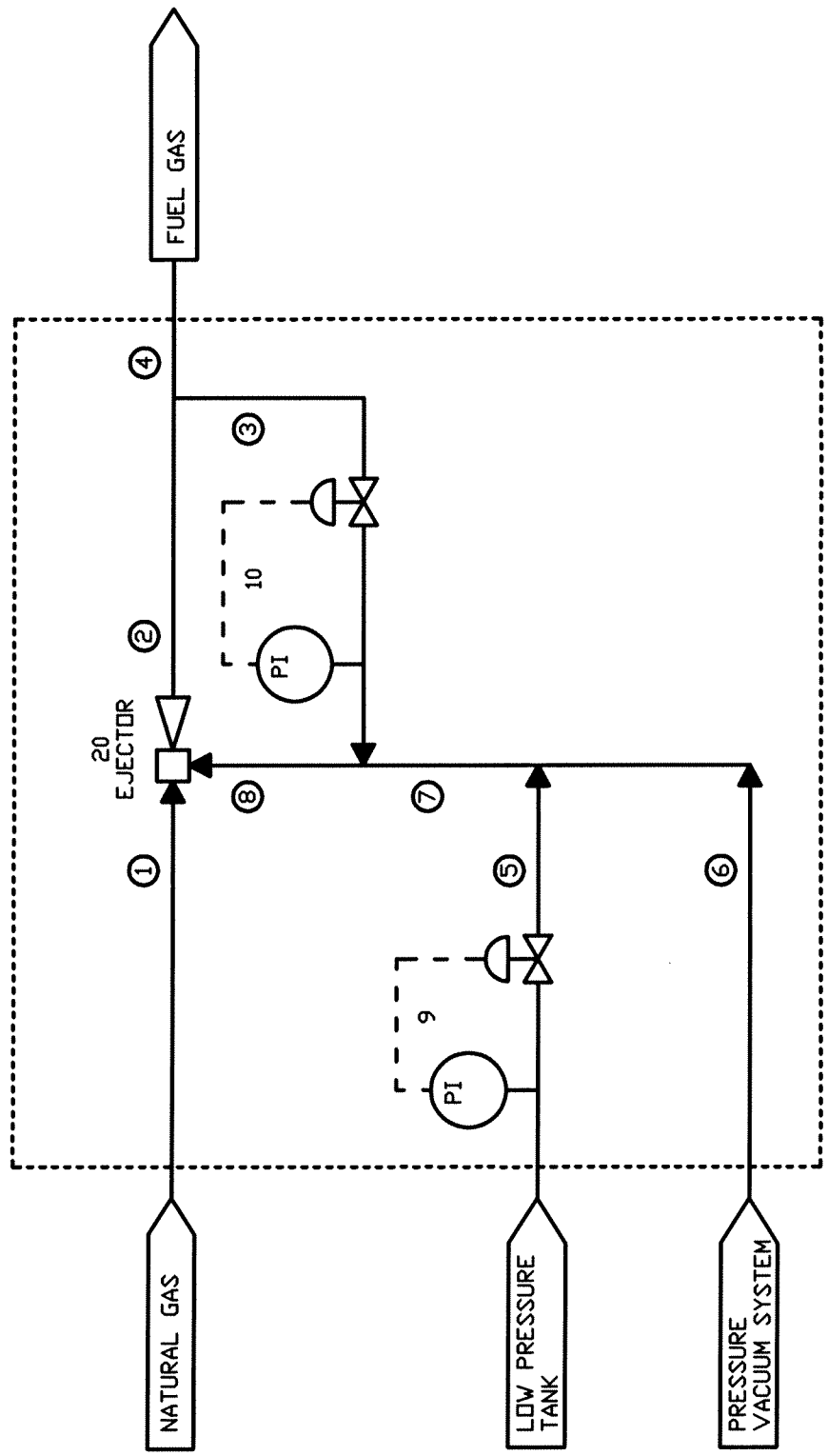

VAPOUR RECOVERY UNIT FOR STEAM ASSISTED GRAVITY DRAINAGE (SAGD) SYSTEM

FIELD OF THE INVENTION

This invention pertains to the field of jet technology, specifically for the evacuation of low pressure gases and diversion into a fuel system instead of release to the atmosphere.

BACKGROUND OF THE INVENTION

Ejectors, jet pumps and eductors have been used for many years in different applications as a means of pumping, vacuuming and mixing. The ejectors operate on the principle of a venturi, through which an energized fluid is directed causing a differential pressure across an orifice situated in a mixing chamber. The mixing chamber has a port to allow gases at a lower pressure than the energizing fluid pressure to be drawn into the chamber due to the created differential between the energized/pressurized line and the lower pressure inlet line. The mixed fluids depart from the chamber at a reduced pressure less than the inlet energized fluid but greater than the lower pressure fluid drawn into the mixing chamber.

Systems utilizing ejectors are not new in the art. U.S. Pat. Nos. 6,199,834 and 6,234,760 teach liquid gas ejectors, U.S. Pat. No. 7,326,285 teaches the use of an ejector for recovering hydrocarbon vapours and reuse of those vapours in alcohol manufacturing.

Ejectors were also used in vapour recovery systems. U.S. Pat. Nos. 6,418,957 and 6,315,000 and US Patent application US2002/0043289 teach eductor system and method of vapour recovery. These patents describe closed systems in which the collected gases are injected back into the recovery process by reducing emission and improving yields. This process is highly dependent on the pressures of the inlets and outlets which have an affect downstream of the process. Further, closed systems require additional equipment to deal with the safety of the system.

Unlike the vapour recovery in conventional oil extraction processes the operations in Steam Assisted Gravity Drainage (SAGD) oil recovery takes place under different conditions. These conditions include a source of high pressure gas for energized fluid and use for the mixed fluids outlet stream. Further SAGD operation has different contents of vapours than the conventional oil extraction.

Currently, in a SAGD facility there are atmospheric tanks containing hydrocarbons or residual hydrocarbons in water such as the dilbit, diluent, and produced water tanks. As these tanks are filled or heated up due to ambient conditions, there is a need to vent the vapours to prevent the tanks from over-pressuring. Since the tanks can contain toxic or flammable gases, discharging the gases to atmosphere on a normal basis is not acceptable. The low design pressure of the tanks prevents venting the vents to flare. These tanks require a system to collect and safely dispose of these gases. The industry standard solution for the recovery of low pressure gases is the use of a Vapour Recovery Unit (VRU). A typical VRU system consists of a compressor, aftercooler and discharge separation drum where the collected vapours are compressed and sent to the fuel gas system for disposal. These systems are expensive, vulnerable to malfunctions and require regular maintenance.

One objective of the present invention is to develop a vapour recovery system tailored for an SAGD process. This system should be inexpensive, easy to maintain and operate, and reliable. This system should also be compatible with a mobile modular SAGD process.

Further and other objects of the invention will become apparent to one skilled in the art when considering the following summary of the invention and the more detailed description of the preferred embodiments illustrated herein.

SUMMARY OF THE INVENTION

The purpose of a typical vapour recovery unit (VRU) system is to collect low pressure gases vented from atmospheric tanks as well as other low pressure equipment and to compress these gases sufficiently so that they can be sent to the fuel gas system. This system prevents atmospheric venting of toxic or flammable gases. The new ejector design takes advantage of the large pressure drop that is available between the natural gas flow and the fuel gas header pressure. The natural gas will serve to provide the motive force for the ejector as well as entraining the recovered gases and driving them into the fuel gas system.

The ejector creates sub-atmospheric pressures at the suction of the ejector unit which collects vent gases from atmospheric tanks and also collects non-condensables from the water treatment and oil separation equipment.

According to a primary aspect of the invention, there is provided a vapour recovery process unit for a Steam Assisted Gravity Drainage system for a heavy oil recovery facility. This process comprising a venturi ejector having one active inlet (1), one passive inlet (8) and one outlet (2). The active inlet being supplied with natural gas to provide the gas flow sufficient to operate the ejector. The passive inlet being connected to a mixture of vented vapours from storage tanks (5) and low pressure equipment (6). The outlet is for supplying fuel to the system along with the natural gas; wherein the movement of the natural gas through the ejector creates a vacuum or a sub atmospheric pressure to draw the vapours from the tanks and low pressure equipment into the ejector and then following mixing, toward the low pressure fuel system. The vented vapours are therefore burned usefully recovering their heat content, instead of being released to the atmosphere.

According to another aspect of the invention, the vapour recovery process obviates the need for flow controllers, flow measuring instruments and temperature measuring instruments since the output of the process is directed to the low pressure fuel system and the flow through the system is kept constant.

According to another aspect of the invention, the vapour recovery process further has a recirculation line (3) with a control valve (10) to control the suction pressure of the ejector. When the flow of the vented gases is insufficient, the discharge of the ejector being re-circulated into the passive inlet to maintain the required pressure.

According to yet another aspect of the invention the tanks and low pressure equipment are provided with emergency overpressure protection whereby releasing to atmosphere and not tied into the collection system, thereby reducing the required capacity of the system.

In a preferable embodiment of the invention, the low pressure tanks (5) are separated from the ejector (7) and other vacuum systems (6) by a pressure control valve (9), whereby the tanks are kept under positive pressure up to the tank design pressure and thereby further minimizing the potential for ingress of air into the system.

According to yet another aspect of the invention the vapour recovery unit for the above described process is installed in a transportable modular mobile system for heavy oil recovery.

Preferably, the vapour recovery process and the system described above is attached to the low pressure equipment which comprises a flash drum system.

Preferably the vapour recovery process and system described herein includes the following features:
a) the tanks and low pressure equipment are provided with vacuum/overpressure protection to atmosphere;
b) the low pressure tanks are separated from the ejector and other vacuum systems by a pressure control valve,
c) the low pressure equipment further comprises a flash drum
d) and the vapour recovery process is installed with a transportable modular mobile system for heavy oil recovery.

BRIEF DESCRIPTION OF THE DRAWINGS

FIG. 1 is a schematic flow diagram of the vapour recovery system.

DETAILED DESCRIPTION OF THE DRAWINGS

FIG. 1 shows the vapour recovery system which comprises an ejector (20) with an active inlet (1) supplying natural gas or any other suitable gas or mixture of gases. The ejector has a passive inlet (8) which is fed from low pressure gases (7) from the gases from low pressure tanks (5) and gases from pressure vacuum systems (6) such as flash drum and boilers. Preferably, the passive inlet (8) is also fed with a recycle stream (3) in order to prevent over suction from the low pressure tanks and to maintain the required pressure in the system. Finally, the ejector (20) has an outlet (2) which feeds the fuel system (4) with a mixture of the inlet gas and the vented gases from the low pressure units and systems.

In the preferred embodiment of the invention there are at least two pressure controllers in the VRU system, the first controller (10) is controlling the recirculation stream and regulates the flow of the outlet gas back into the passive inlet of the VRU to prevent over suction from the low pressure tanks. The second controller (9) separates the low pressure tanks from the VRU system and thus allowing the low pressure tanks to run at a small positive pressure to reduce the potential of drawing air into the fuel system. The controller also allows the tanks to act as a single system such that filling one tank in the system from a second tank in the system results in no demand for blanket gas and no requirement for venting.

In the current invention, the venturi ejector is utilized to increase the pressure of the low pressure gases by using the difference in pressure of the natural gas supplied to the facility versus the natural gas pressure required within the facility. This increase in pressure in the low pressure gas allows the gas to be drawn up to fuel gas pressure where the combined natural gas and low pressure gas stream are used for fuel.

The low pressure gases from storage tanks and other low pressure equipment are primarily hydrocarbon streams with some being saturated in water. They cannot be vented to the atmosphere because of their hydrocarbon content, and cannot be directly sent to a flare system or a fuel system because of their low pressure.

Control of the ejector suction pressure is achieved by a recirculation line (3) and control valve (10). When vent flows are less than design, the discharge fuel gas from the ejector is re-circulated back to the vent gas suction line to maintain the required suction pressure.

Ejectors do not incorporate any moving parts so mechanical failures would be very infrequent. In addition the control on the ejector system will be very straightforward and will not be vulnerable to system malfunctions/trips that are commonly encountered on VRU compressor units.

The ejector system represents a significant capital cost saving. A compressor based VRU system for a facility production capacity as per the design currently used on the market would have an installed cost of approximately $3 million (CDN, 2010). The preliminary estimate of installed cost for the ejector system according to the current design is in the order of $30K (CDN, 2010).

Other benefits of the current design:

The current VRU design uses the mixed stream as fuel for the facility with no intention of recovering and selling the recovered hydrocarbons as it was in the prior art systems, for example as described in the background of the invention.

The prior art systems used a vessel vacuum safety line and device going into the suction of the eductor. In the current VRU design, the overpressure protection devices discharge to the atmosphere because of the capacity of the eductor. The overprotection capacity accounts for emergency overpressure scenarios such as fire, which would require a much larger eductor and hence increased natural gas flow to drive the eductor. The second overpressure scenario is the failure of the eductor, where venting the tanks to atmosphere is a lower risk than the installation of a second eductor in parallel with the original eductor. The standard overprotection system is a vent similar to the current standard design with a pressure vacuum relief valve directed to the atmosphere. Release of the overpressure event to the atmosphere will reduce the cost of the equipment and the process but would not cause a hazardous situation.

The motive gas source, for the inventive system is a high pressure natural gas supplied to the facility or any other gas or mixture of gases suitable to feed a fuel system.

Prior art system which uses various gas sources, required a high pressure gas compressor with excess capacity. This processor is not required in the current system. Elimination of this extra compressor further reduces the cost of the system and its operation.

The prior art systems require extensive instrumentation such as pressure, temperature and flow indications sufficient to define the operating condition of the venturi, whereas the system of the current design limits the instrumentation to that required to ensure the safe operation of the unit. The outlet gas is forwarded to the fuel system.

The elimination of several units of heavy and bulky equipment not only reduces the cost of the system and it operation, but also makes it suitable to use in a mobile modular unit which are best suited for SAGD projects. Since the extraction of the oil from oil sand requires mobility from one area to another unlike the conventional oil pumping, the number of units, there stability and complexity plays an important role in the design of SAGD systems.

Preferred Mode of Operation:

The natural gas is fed to the fuel gas header via a pressure control valve to maintain downstream header pressure. A portion of the natural gas stream bypasses the control valve and passes through the natural gas ejector. Low pressure (atmospheric) vented gases are drawn into the fuel gas system at the ejector suction. For the ejector to work properly and to ensure the low pressure vent gas header does not overpressure, the flow of natural gas to the ejector must remain constant. This flow is normally a small proportion of the total natural gas flow going through the main natural gas pressure control valve, so the control of the downstream fuel gas header pressure is not compromised. The natural gas from the ejector and from the pressure control valve is combined and fed into the fuel gas system. Further the suction of the ejector is utilized to create a vacuum or sub-atmospheric pressure in flash drum unit upstream as previously discussed.

Preferably, the VRU unit is installed with a mobile modular SAGD system for a heavy oil recovery facility.

As many changes can be made to the preferred embodiment of the invention without departing from the scope thereof; it is intended that all matter contained herein be considered illustrative of the invention and not in a limiting sense.

I claim:

1. A vapour recovery process for a SAGD (Steam Assisted Gravity Drainage) system for a heavy oil recovery facility, the process comprising:
providing a venturi ejector having one active inlet, one passive inlet, a recirculation line with a control valve to control the suction pressure of the ejector, and one outlet; supplying the active inlet with natural gas to provide gas flow sufficient to operate the ejector, connecting the passive inlet to a mixture of vented vapours from storage tanks and low pressure equipment, supplying fuel via the outlet to a low pressure fuel system along with the natural gas, creating a vacuum so as to draw the vapours from the tanks and low pressure equipment into the ejector and then toward the low pressure fuel system, burning the vented vapours, selectively recirculating the discharge of the ejector into the passive inlet to maintain a selected pressure, and recovering a heat content of the burned vented vapours at the heavy oil recovery facility.

2. The vapour recovery process of claim 1 wherein the process obviates the need for flow controllers and flow measuring instruments, since the output of the process is directed to the low pressure fuel system and the flow through the system is constant.

3. The vapour recovery process of claim 1 wherein the tanks and low pressure equipment are provided with vacuum/overpressure protection to atmosphere and not tied into this collection system, thereby reducing the cost of the system.

4. The vapour recovery process of claim 1 wherein the low pressure tanks are separated from the ejector and other vacuum systems by a pressure control valve, whereby the tanks are kept at a positive pressure up to the tank design pressure thereby minimizing the ingress of air into the system.

5. The vapour recovery process of claim 1 wherein the venturi ejector and the recirculation control valve are installed on a transportable modular mobile system for heavy oil recovery.

6. The vapour recovery process of claim 1 wherein the low pressure equipment further comprises a flash drum system.

7. The vapour recovery process of claim 6 installed with a transportable modular mobile system for heavy oil recovery.

8. The vapour recovery process of claim 1 wherein the low pressure tanks and low pressure equipment are provided with vacuum/overpressure protection to atmosphere, the low pressure tanks being separated from the ejector and other vacuum systems by a pressure control valve.

9. The vapour recovery process of claim 8 further comprising providing a flash drum for the low pressure equipment.

10. The vapour recovery process of claim 9 further comprising installing the venturi ejector and the recirculation control valve on a modular mobile system.

\* \* \* \* \*